C. A. HONSINGER.
REVERSIBLE TREAD MEMBER FOR WHEELS.
APPLICATION FILED JUNE 27, 1919.
1,369,972.
Patented Mar. 1, 1921.
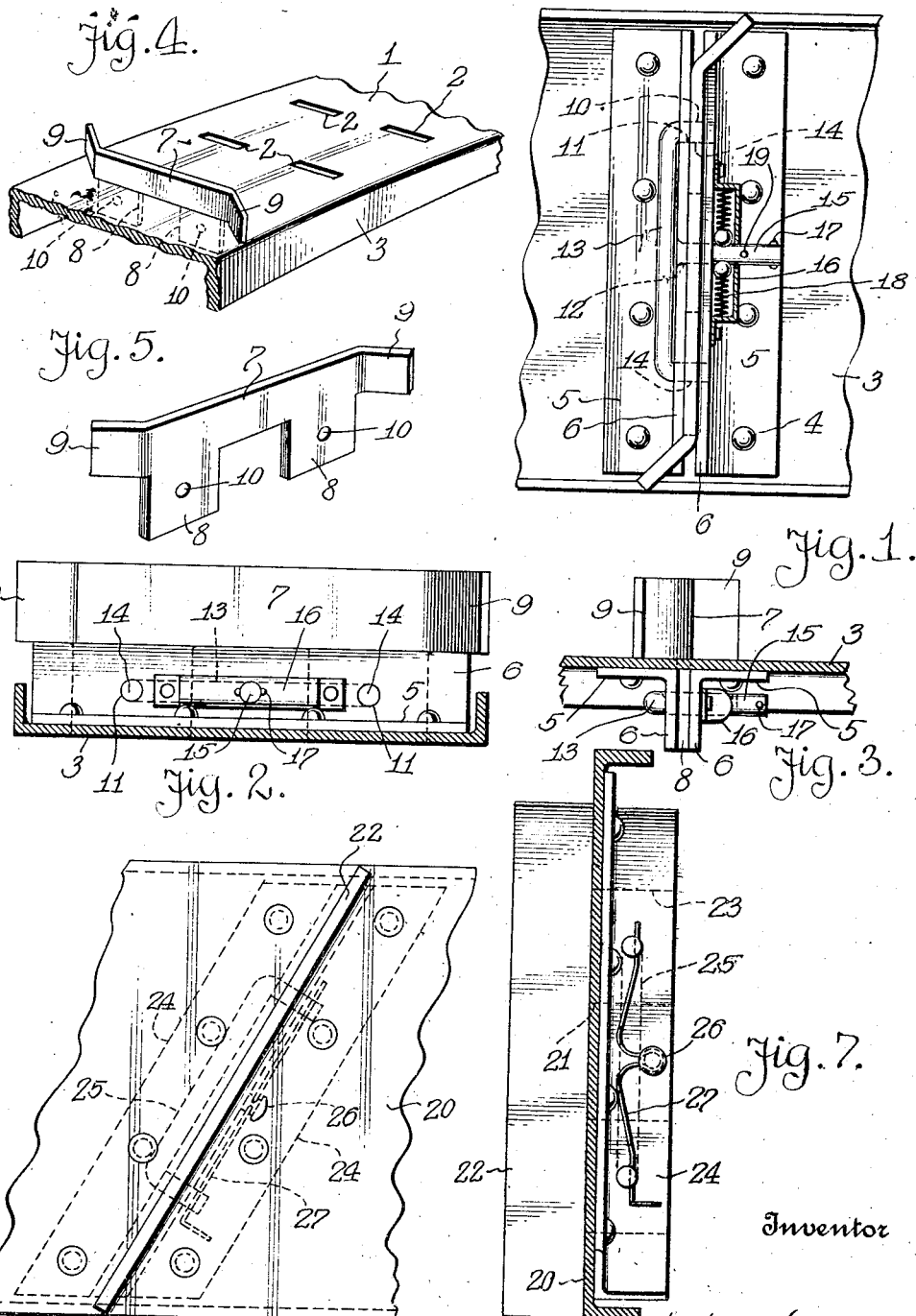
Inventor
Charles A. Honsinger
By
Attorneys

UNITED STATES PATENT OFFICE.

CHARLES A. HONSINGER, OF DETROIT, MICHIGAN.

REVERSIBLE TREAD MEMBER FOR WHEELS.

1,369,972.  Specification of Letters Patent.  Patented Mar. 1, 1921.

Application filed June 27, 1919. Serial No. 307,109.

*To all whom it may concern:*

Be it known that I, CHARLES A. HONSINGER, a citizen of the United States of America, residing at Detroit, in the county of Wayne and State of Michigan, have invented certain new and useful Improvements in Reversible Tread Members for Wheels, of which the following is a specification, reference being had therein to the accompanying drawings.

This invention relates to reversible or invertible tread members for vehicle wheels and has special reference to the tread members or spuds of tractors and large motor driven farm vehicles or implements. State, county and city authorities prohibit the operation of a tractor having permanent tread members or spuds traveling on paved streets, or good roads, as the tread members or spuds cut into the street or road and eventually ruin the same. In order that a farm tractor or implement can be moved on streets or roads, without injury to the same, and yet have the proper tractive power in a field, I have devised a novel reversible or invertible tread member or spud that may be easily and quickly extended or retracted, relative to the rim of a wheel, either to present protuberances on the periphery of the wheel or a smooth tread or rim.

My invention further aims to provide simple, durable and inexpensive means for attaching a tread member or spud to the rim of a wheel, so that the member or spud may be positioned on either side of the wheel rim.

My invention still further aims to provide tread members which will permit of clogged earth and other matter being quickly and easily removed from the rim of a wheel, and the construction of my invention will be hereinafter specifically described and then claimed.

Reference will now be had to the drawing, wherein—

Figure 1 is a plan of the inner wall of a wheel rim provided with a tread member in accordance with my invention;

Fig. 2 is a cross sectional view of the same;

Fig. 3 is a longitudinal sectional view of the same;

Fig. 4 is a perspective view of a portion of the wheel rim provided with a tread member in accordance with my invention;

Fig. 5 is a perspective view of a detached tread member;

Fig. 6 is a plan of the outer wall of a portion of a wheel rim provided with a tread member, illustrating a slight modification of my invention; and Fig. 7 is a cross sectional view of the same.

In the drawing, the reference numeral 1 denotes a portion of a wheel rim provided with sets of transversely alining slots 2 and these slots may be equally spaced about the rim or periphery of the wheel. The rim 1 may also have inwardly extending annular side flanges 3 or may have any other desired cross-sectional shape.

Connected to the rim 1, by rivets 4 or other fastening means, and at each set of transversely alining slots 2, are the lateral flanges 5 of parallel guides 6, each guide being preferably in the form of an angle bar. The guides 6 have the confronting walls thereof flush with the longitudinal walls of the slots 2 and said guides also serve as braces on the inner wall of the wheel rim.

7 denotes a tread member having a set of lugs 8 spaced according to the slots 2 and adapted to extend through said slots in one position of the tread member and in another position of the tread member extend into said slots to close the same. The tread member 7 has angularly disposed ends 9, as best shown in Figs. 4 and 5 and when the tread member is on the outer wall of the wheel rim, the angularly disposed ends 9 extend to the side edges of the rim and coöperate with the tread member in providing a good tractive element. When the tread member 7 is inverted and placed at the inner wall of the wheel rim, as shown in Fig. 2, the angularly disposed ends 9 of the tread member rest on the guides 6 and position the lugs 8 between said guides so that the ends of the lug close the slots 2 and provide a smooth periphery for the wheel rim 1.

The lugs 8 of the tread member are provided with openings 10 adapted to register with openings 11 in the guides 6, and in addition to the openings 11 there are intermediate openings 12.

13 denotes a locking member having end prongs 14 and an intermediate prong 15 with the end prongs 14 extending through the openings 10 and 11, the intermediate prong 15 extending through the openings 12, between the lugs 8 of the tread member. The intermediate prong 15 is of greater length than the end prongs 14 and said intermediate prong extends through a lock casing 16 suitably connected to one of the guides 6, intermediate the ends thereof, said lock casing having an opening providing clearance for the intermediate prong. The outer end of the intermediate prong 15 has a cross pin or side projections 17 that prevent the complete withdrawal of the locking member 13 in the guides 6, said intermediate prong being of sufficient length to permit of the locking member being retracted to move the end prongs 14 out of the openings 10 of the tread member lugs 8, thus permitting of the tread member being withdrawn from between the guides 6.

In the lock casing 16 are automatic locking devices 18, preferably in the form of spring pressed members adapted to engage opposite walls of the intermediate prong 15 and hold said prong stationary relative to the lock casing, yet permit of the locking member 13 being manually shifted to release or lock the tread member as occasion requires. In addition to the locking members within the lock casing 16, the intermediate prong 15 may be provided with a transverse pin 19 which will positively hold the locking member 13 against accidental displacement.

It is apparent from the above that when the pin 19 is removed that the locking member 13 can be easily shifted to release the lugs 8 of the tread members 7 and that said tread members may be positioned either on the outer wall of the wheel rim 1 or on the guides 6 at the inner wall of the rim member. In the former position the tread members project from the periphery of the wheel and increase the tractive power thereof, and in the latter position the slots 2 are closed and there is a smooth and uninterrupted periphery for the wheel.

A modification of my invention has been illustrated in Figs. 6 and 7 and in this instance the wheel rim 20 has slots 21 disposed diagonally of the periphery thereof, and the tread member 2 is straight in contradistinction to the form of tread member shown in Fig. 5. The member 22 has apertured lugs 23 adapted to extend between guides 24 on the inner wall of the wheel rim 20 and a two-prong locking member 25 which is used somewhat similar to the three prong locking member 13 previously referred to. On one of the guides 24 is a post 26 for a spring 27 adapted to have its ends engage the end prongs of the locking member 25, as best shown in Fig. 7. By first releasing one end of the spring 27 the opposite end thereof will be automatically moved and thus release the locking member 25, so that said locking member can be withdrawn sufficiently to release the tread member 22 and permit of said tread member being positioned at either wall of the rim.

It is thought that the utility of my improvement will be apparent without further description, and while in the drawing there are illustrated the preferred embodiments of my invention, it is to be understood that the structural elements are susceptible to such variations and modifications as fall within the scope of the appended claims.

What I claim is:—

1. The combination of a wheel rim having a slot, a guide on the inner wall of said rim, a tread member having a guide portion in said guide and extending laterally on to wheel rim, said tread member having its guide portion proportioned relative to said guide so that said tread member may be reversed to have its rim portion rest on said guide and its guide portion fill the rim slot and complete the ground engaging smooth surface of the wheel rim, and means carried by said guide adapted for holding said tread member in either position relative to said wheel rim.

2. The combination as set forth in claim 1, wherein said means includes a locking member extending through said guide, and spring pressed locking devices for engaging said locking member.

3. As a new article of manufacture, a wheel rim tread member having lugs adapted to extend through a rim and be anchored relative thereto, and angularly disposed ends adapted to extend in proximity to the side edges of the wheel rim.

In testimony whereof I affix my signature in the presence of two witnesses.

CHARLES A. HONSINGER.

Witnesses:
 KARL H. BUTLER,
 ANNA M. DORR.